United States Patent [19]
Sproull et al.

[11] Patent Number: 5,748,539
[45] Date of Patent: May 5, 1998

[54] RECURSIVE MULTI-CHANNEL INTERFACE

[75] Inventors: Robert F. Sproull, Newton, Mass.; Ivan E. Sutherland, Santa Monica, Calif.

[73] Assignee: Sun Microsystems, Inc., Mountain View, Calif.

[21] Appl. No.: 811,909

[22] Filed: Mar. 5, 1997

[51] Int. Cl.[6] .................................................. G11C 7/00
[52] U.S. Cl. ............................ 365/189.04; 365/230.09; 365/189.01
[58] Field of Search ..................... 365/189.04, 189.01, 365/189.12, 230.05, 230.09

[56] References Cited

U.S. PATENT DOCUMENTS

| | | | |
|---|---|---|---|
| 5,473,574 | 12/1995 | Clemen et al. | 365/189.04 |
| 5,493,536 | 2/1996 | Aoki | 365/189.04 |
| 5,513,139 | 4/1996 | Butler | 365/189.04 |

Primary Examiner—Vu A. Le
Attorney, Agent, or Firm—Townsend and Townsend and Crew LLP

[57] ABSTRACT

A multi-channel recursive interface having independent channels that can be used in, for example, multi-level memory systems is disclosed. Separate read and write command channels and read and write completion channels permit concurrent read and write operations. A memory system according to the present invention uses a write buffer to resolve read data ambiguity when concurrently reading and writing into the same memory location. With independent and asynchronous read and write channels, the interface of the present invention retains its properties even if separated from the system it interfaces by communication channels exhibiting any latency such as first in first out (FIFO) registers of arbitrary lengths. Such FIFOs can improve the throughput of the communication channels between the interface and the system it interfaces with. The recursive interface can flexibly serve many levels of memory.

40 Claims, 9 Drawing Sheets

RECURSIVE MULTI-CHANNEL INTERFACE

BACKGROUND OF THE INVENTION

The present invention relates in general to electronic circuits and systems, and in particular to a recursive interface that can be used in for example multi-level memory systems.

A typical interface for conventional memory systems uses the same channel to process read and write operations. Due to the shared read/write channel, the interface for such memory systems can not permit concurrent read and write operations. Thus, each cycle of operation using the channel must be defined either as a write cycle or a read cycle. Also, while all memory systems report completion of read operations by returning data, existing interfaces fail to report completion of write operations, or report it implicitly. This further complicates the interface mechanism for interleaved memory systems with multiple memory banks. Memory requests are often processed one at a time and require special timing signals to avoid collisions. The interface is thus sensitive to delay and must complete one memory operation before accepting the next. The conventional memory system interface is, therefore, relatively inflexible and inefficient in terms of memory operation throughput.

SUMMARY OF THE INVENTION

The present invention offers a recursive interface that can be used in for example multi-level memory systems. The interface uses separate communication channels for read and write operations, permitting read and write to happen concurrently. The interface explicitly reports completion of each write operation as well as each read operation. In the case of concurrent read and write operations to the same memory location, data is always read and written in conformance with the interface specification, but the data reported by the read channel may not contain useful information. Other provisions can be made to ensure that read data contains valuable information in the case of such a conflict.

In one embodiment, each channel of the interface of the present invention is asynchronous and thus delay insensitive. Having independent and asynchronous read and write channels, the interface retains its properties even if separated from the system it is interfacing with by communication channels having arbitrary latency such as first-in first-out (FIFO) registers of any length. Such FIFOs can improve the throughput of the communication channels. In another embodiment, the communication channels are synchronous with any desired latency.

Further, a multi-level memory system is only one example of a client system for this interface, and any type of information-handling system can use the recursive interface of the present invention.

Accordingly, in one embodiment, the present invention provides a multi-channel interface as a primary interface for communicating with an information-handling system. The primary interface includes four channels as follows: a first channel carrying information to the information-handling system, a second channel carrying information from the information-handling system and in response to the information carried in the first channel, a third channel carrying information to the information-handling system, and a fourth channel carrying information from the information-handling system and in response to the information carried in the third channel. Further the interface permits four communication channels with arbitrary delays each having a first and a second terminal, the first terminal of each being respectively coupled to the first, second, third, and fourth channels, such that the second terminals of the four delay elements form a secondary interface with four channels that retain all properties of the four channels of the primary interface.

In another embodiment, the present invention provides a memory interface that includes a read command channel carrying read address, a write command channel carrying write address and data, a read completion channel carrying the data read, and a write completion channel carrying a write completion signal, wherein, all four channels are asynchronous concurrent channels each with its own handshake signals such as request and acknowledge. The interface maintains a sequence of information in the read completion channel the same as the read command channel, and similarly for the write completion channel and the write command channel. In an alternate embodiment, the interface can deliver outputs in a different sequence from the sequence of read and write commands and the sequence is identified by extra tag bits added to each command and returned in the completion channels.

A system using the interface of the present invention may include communication channels with arbitrary delays in each of the four channels, wherein the resulting interface channels maintain the same properties as the interface of the present invention. Such a system may further include a write buffer coupled to the four communication channels to reduce the time that write commands are outstanding and increase the likelihood of generating useful read data in the case of concurrent read and write operations to the same memory location.

In yet another embodiment, the present invention provides a memory system including a memory array, a read control module with a read command input and a read completion output, and a write control module with a write command input and a write completion output. The read control module supplies read address to the memory array and receives read data from the memory array, and the write control module supplies write address to the memory array and supplies write data to the memory array.

A better understanding of the nature and advantages of the memory interface of the present invention may be had with reference to the detailed description and drawings below.

DESCRIPTION OF SPECIFIC EMBODIMENTS

Figure 1:
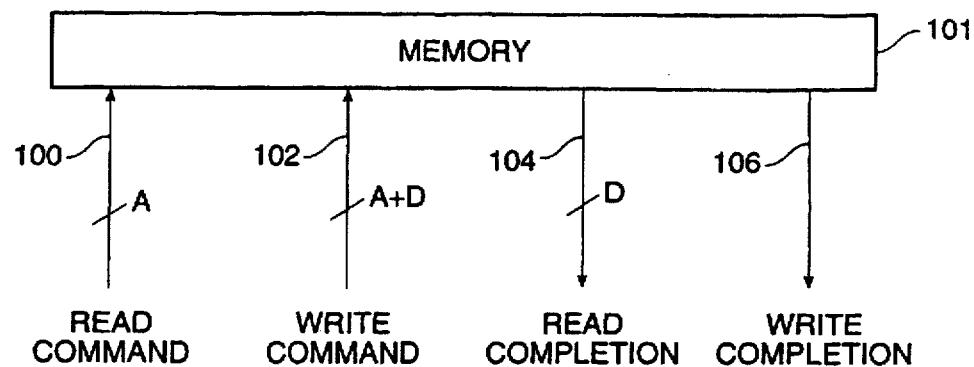
FIG. 1 shows a simplified model of the recursive memory interface according to the present invention.

Referring to FIG. 1 there is shown an interface for a memory system 101 according to the present invention in its simplest embodiment. This embodiment of the interface includes four asynchronous and concurrent channels, each with its own handshake (e.g., request, acknowledge, etc.) signals and its own data path. Various types of asynchronous data formats including, for example, bundled data may be used with the interface. As shown in FIG. 1, the channels are: read command channel 100 that carries the read address, write command channel 102 that carries the write address and data, read completion channel 104 that returns the data read, and write completion channel 106 that carries a handshake signal indicating completion of a write operation. In the embodiment shown in FIG. 1, write completion channel 106 carries no data at all but provides write completion signals in sequence.

In another embodiment of this interface, the sequence of the data value read from memory system 101 in read completion channel 104 tracks the sequence of read addresses in read command channel 100, and similarly, the sequence of write completion signals in write completion channel 106 tracks that of write addresses in write command channel 102. In an alternate embodiment, the interface does not track the sequence and instead tag bits are used with each command to identify the sequence of the read and write commands in each channel. The tag bits are returned in the corresponding completion channel.

One advantage of this interface is that it accommodates concurrent read and write operations. A read operation and a write operation are concurrent if both are active at the same time on the memory side of the interface. Thus, if a read command is issued prior to completion of a write operation, or vice versa, the operations are concurrent. The concurrent read and write operations as permitted by this interface always guarantee proper write operation into memory, but guarantee only that some data will be read from memory, if data is being written into the same location during the read operation. Thus, while read operations always complete according to this interface specification, their data may not contain useful information in the case of concurrent read and write operations with matching addresses. Of course, a read operation begun following the completion of a write operation will always yield valuable read data whether or not their addresses match.

Another feature of the interface of the present invention is that because write commands come through a separate logical channel from read commands, a memory system using this interface can give different priority to read and write operations. For example, it can give priority to reads, postponing writes as necessary.

Figure 2:
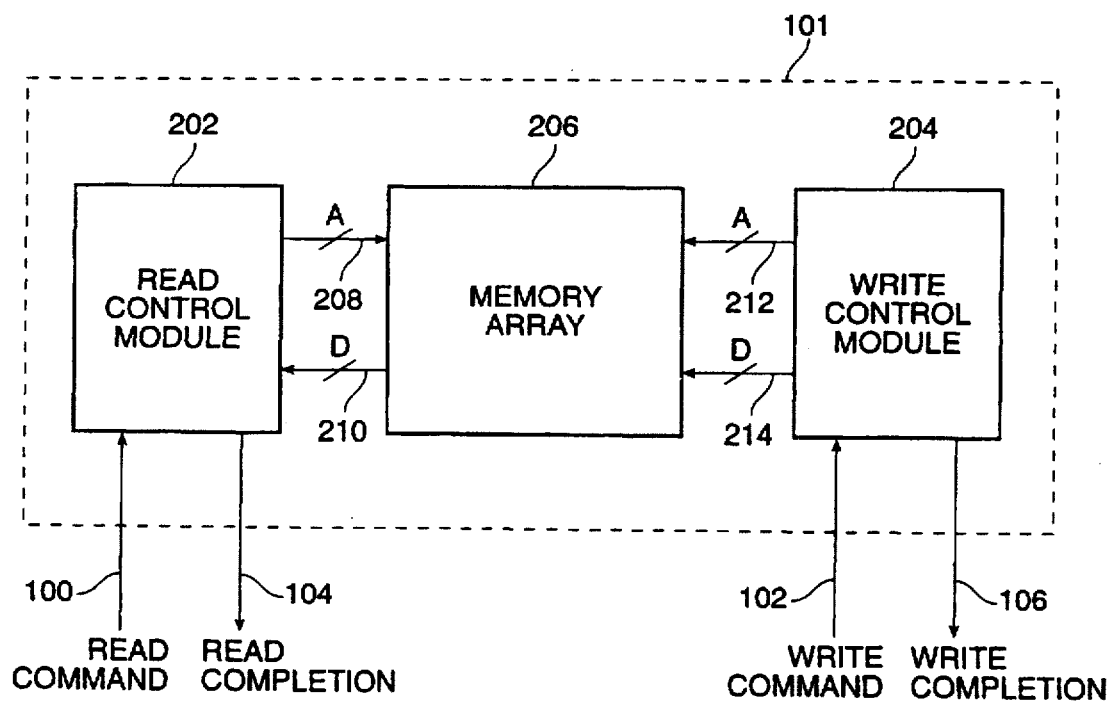
FIG. 2 is a block diagram for an exemplary embodiment of a memory system with the interface of the present invention.

One example of memory system 101 for use with these communication channels is depicted in FIG. 2. In this figure, as in the rest of the diagrams and throughout this description, the same reference numerals are used to refer to the same elements. FIG. 2 shows memory system 101 including a read control module 202 connected between read command channel 100 and read completion channel 104. It also includes a write control module 204 connected between write command channel 102 and write completion channel 106. Read and write control modules 202 and 204 are entirely independent except that both can access memory array 206.

In the embodiment where the sequence of the read and write commands is preserved, read control module 202 acts as a first-in first-out (FIFO) pipeline that converts addresses from read command channel 100 into the proper data values delivered to read completion channel 104 by accessing memory array 206 via a read address bus 208 and read data bus 210. Write control module 204, also acting as a FIFO pipeline, records the data values from write command channel 102 into memory array 206 via a write address bus 212 and a write data bus 214, and delivers dataless output to write completion channel 106 to indicate that writing is complete. Each control module may include a FIFO pipeline that is several stages long delivering outputs in the same sequence as it received inputs. Thus, read completion signals and their data emerge in the same sequence as read commands entered. Similarly, completion events from write commands emerge in the same sequence as write commands entered. Because the two control modules and their FIFO pipelines are independent, however, memory system 101 permits any interleaving of reads and writes. A read command and write command entered concurrently may emerge in either sequence depending on congestion and the speed of the memory system. But the read command remains in sequence with respect to other read commands, and similarly, the write command remains in sequence with respect to other write commands.

In an alternative embodiment, additional information is included in read and write completion channels 104 and 106. In one example, read completion channel 104 is configured to pass the address, or a similar identifier, in addition to the read data. Similarly, write completion channel 106 may be configured to pass the write address, or a similar identifier, instead of a dataless event. Passing read addresses through read completion channel 104 permits memory system 101 to rearrange the sequence of read operations. Passing write addresses through write completion channel 106 permits memory system 101 to rearrange the sequence of write operations. A modification of this embodiment passes unrelated tag bits through read or write channels or both. Such tag bits in read channels 100 and 104 may, for example, designate the destination register for the read data. Such tag bits in write channels 102 and 106 may, for example, assist the system in dealing with out of sequence write operations. In the embodiment where sequence identifying tag bits are included in the read and write commands, the interface of the present invention no longer needs to preserve the sequence of the commands and can process and report completion of reads and writes out of sequence.

Another advantageous feature of the interface of the present invention is that it retains its properties even if separated from the system it interfaces with by communication channels having arbitrary and different delays. Such communication channels may include transmission lines, data buffers, FIFO registers or queues that might connect two remote systems. It is to be understood, that this novel recursive nature of the interface of the present invention is not limited to memory applications, and that the advantages of this recursive interface can be realized when communicating with other types of data handling systems as well. The example of a memory system is used herein in connection with FIG. 3A for illustrative purposes.

Figure 3A:
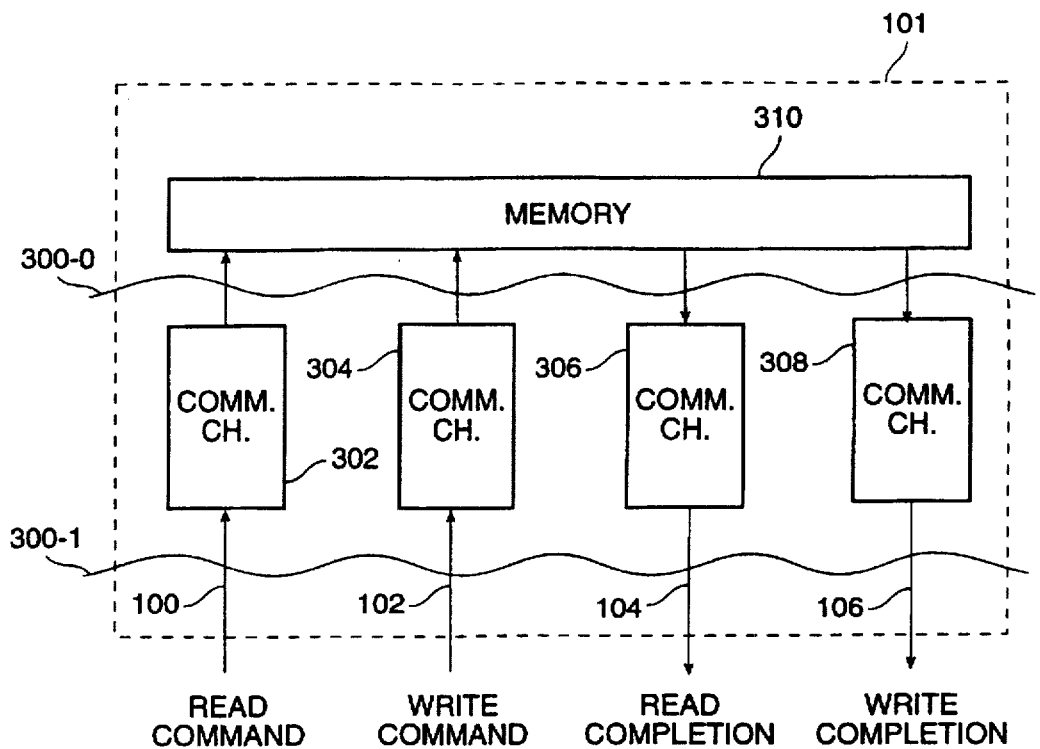
FIG. 3A illustrates the recursive nature of the interface of this invention by depicting two identical multi-channel interfaces being separated by communication channels having arbitrary delays.

FIG. 3A shows four communication channels 302, 304, 306 and 308 respectively connected between the four channels of interface 300-0 of a memory system 310 and interface 300-1. Using, for example, FIFO registers of arbitrary capacity as communication channels 302, 304, 306, and 308, would serve to improve the throughput of the communication between the interface and memory itself. Memory interface 300-0, even if residing at the far end of a physically long communication path as shown, meets an identical interface specification as the specification for the interface at the near end of the communication path, labeled 300-1. The recursive nature of the interface of the present invention allows insertion of multiple levels of buffers and FIFOs along the communication paths as will be shown hereinafter. In fact, this recursive nature can be further highlighted by placing the entire system shown in FIG. 3A inside a box 101 which would have the identical properties of memory system 101 shown in FIGS. 1 and 2.

Figure 3B:
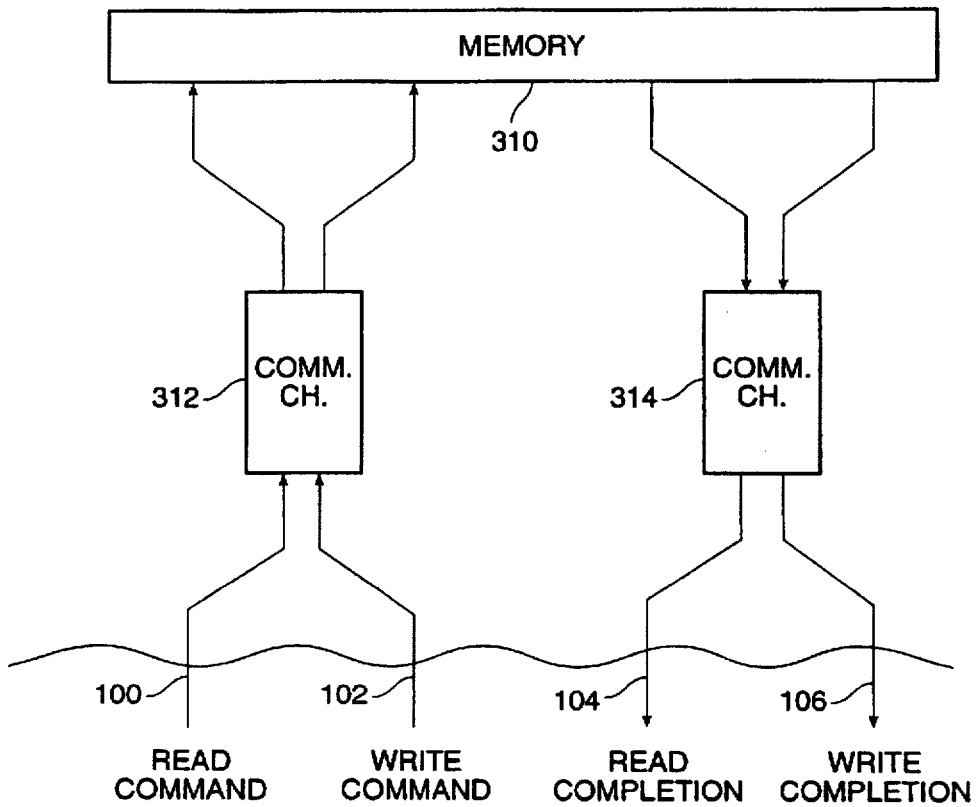
FIG. 3B illustrates an embodiment wherein four channels of the interface of the present invention are combined into fewer (e.g., two) physical channels of communication.

It is to be understood that while the interface of the present invention has been described as having four distinct communication channels, it is possible to combine these channels into fewer channels while maintaining the inventive properties of the interface. FIG. 3B shows one example of an interface according to the present invention that combines the four channels into two channels 312 and 314. Channel 312 combines into a single channel both read and write command channels, and channel 314 combines into a single channel both read and write completion channels. This can be accomplished using various known multiplexing techniques such as time division multiplexing.

Because the interface of the present invention permits concurrent read and write operations, it may be desirable to make special provisions for the case involving concurrent read and write operations at the same memory location. In the exemplary memory system of FIG. 2, to retain totally independent read and write paths, the interface specification refrains from specifying how to interleave read and write commands concurrently in process. Read and write operations involving different memory locations present no collision, and result in reliable read data. Concurrent accesses at the same location for read and write, however, may collide. In this case the memory always writes correctly, and always produces some read data output, but the value of the read data delivered is ambiguous. Because the interface specification is silent on the interleaving sequence of concurrent reads and writes, the data value read out during a concurrent write operation may be the previous value from memory, the newly written value, or a mixture of bits from each.

Figure 4:
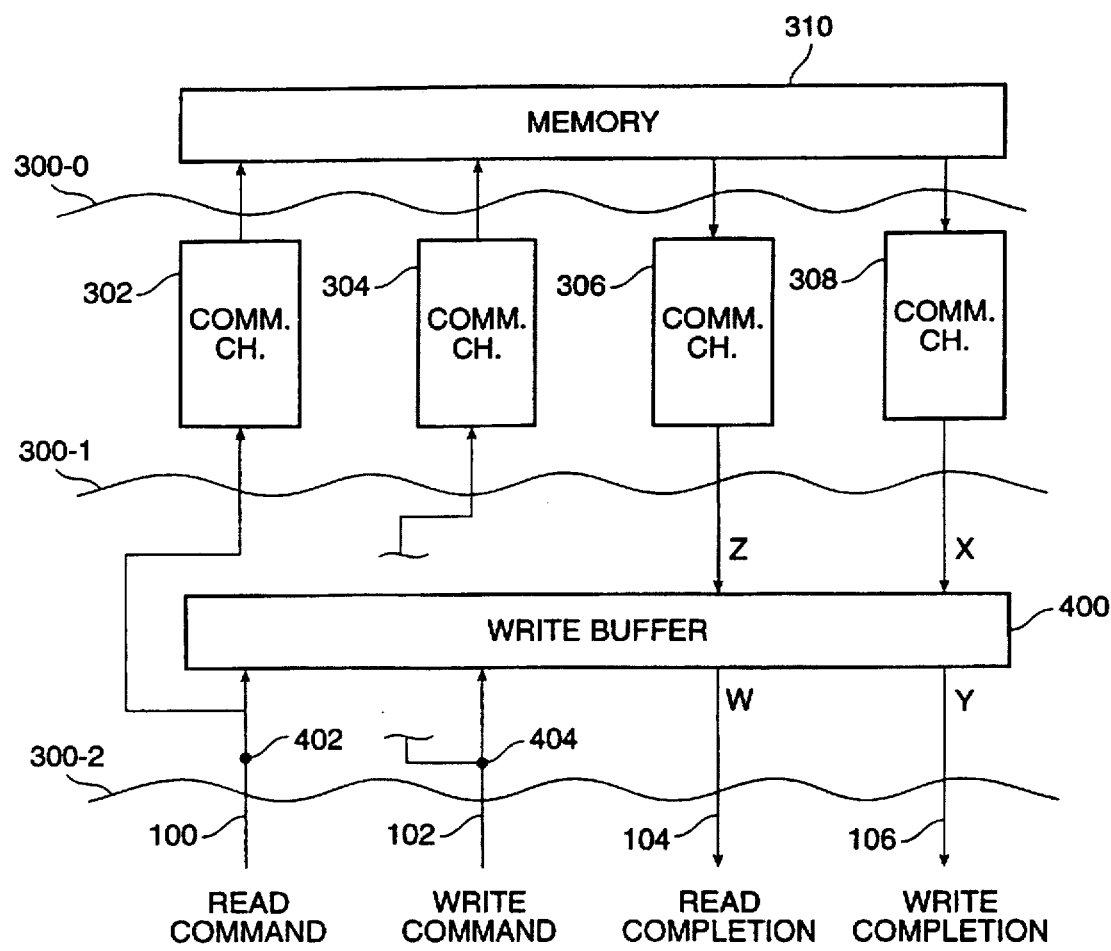
FIG. 4 shows the memory interface augmented by a write buffer along with communication channels according to an embodiment of the present invention.

Two different conditions can give rise to read data ambiguity. In the first condition, a read command issues while a write operation with a matching address is being processed (read-after-write). The second condition occurs when a write command issues while a read operation with a matching address is being processed (write-after-read). Both are considered as concurrent read and write. Under both conditions, the concurrent read operation may return the previous (prewrite) value, the newly written value, or a mixture of bits from each, if at the instant of reading some but not all bits have already been written. One embodiment of the present invention eliminates the ambiguity caused by the first condition (read-after-write) by using a write buffer that can be inserted in the communication channels of the recursive interface as shown in FIG. 4. The ambiguity caused by the second condition (write-after-read) is eliminated by using a sequenced write buffer with a slightly modified interface which will be described in connection with FIGS. 6 and 7. It should be noted, however, that generally a vast majority of accesses involve distinct addresses, and therefore only a small percentage of operations will interfere with each other.

FIG. 4 shows one example of how a write buffer 400 can be used with the system shown in FIG. 3A to eliminate the concurrent read-after-write type of ambiguity. Read command channel 100 and write command channel 102 are delivered in parallel to both write buffer 400 and memory 310. The communication path branch points 402 and 404 shown in the two left paths as dots include means (not shown) well known by those skilled in the art for ensuring proper delivery of each data element to both receiving units. Completion paths from write buffer 400, W and Y, serve the user through interface 300-2 and are quite separate from completion paths from memory 310, Z and X, at interface 300-1.

Write buffer 400 preferably includes a small local memory (not shown) to correct ambiguous reads. In operation, the local memory records as many data elements as there can be partly processed write commands in the memory system it serves, including elements in the communication path to and from the memory between 300-1 and 300-0. Usually this involves at most a few dozen elements and often only three or four. Write buffer 400 holds correct data values for addresses in memory that the memory has been told to write but not yet completed writing. When processing read commands, the write buffer either passes data directly from the memory output path, Z of interface 300-1, if there is no concurrent write, through to its own output path, W of interface 300-2, or substitutes its stored value based on its knowledge of outstanding writes.

If several write commands to the same location are outstanding, write buffer 400 delivers a value corresponding to the most recent write command. Each write command that it receives through interface 300-2 gives write buffer 400 data to retain in its local memory. Each write completion signal that it receives from memory 310 through path X of interface 300-1 allows write buffer 400 to discard the corresponding data element from its memory since the write operation is completed and can no longer be concurrent with a read operation.

The write completion signal from write buffer 400 (path Y of interface 300-2) is used by write buffer 400 to indicate that it has completed its recording process. Write buffer 400 can write into its small local memory faster than main memory 310 can, resulting in prompt write completion returns from write buffer 400. However, interface 300-2 also enjoys all the properties of the interface as defined by the present invention, which gives write buffer 400 flexibility in writing into its local memory and users flexibility in applying the system. Further, it is to be understood that the inclusion of communication channels 302, 304, 306, and 308 is optional, and that the advantage offered by the use of write buffer 400 is not impacted whether these communication channels are present or not.

Figure 5A:
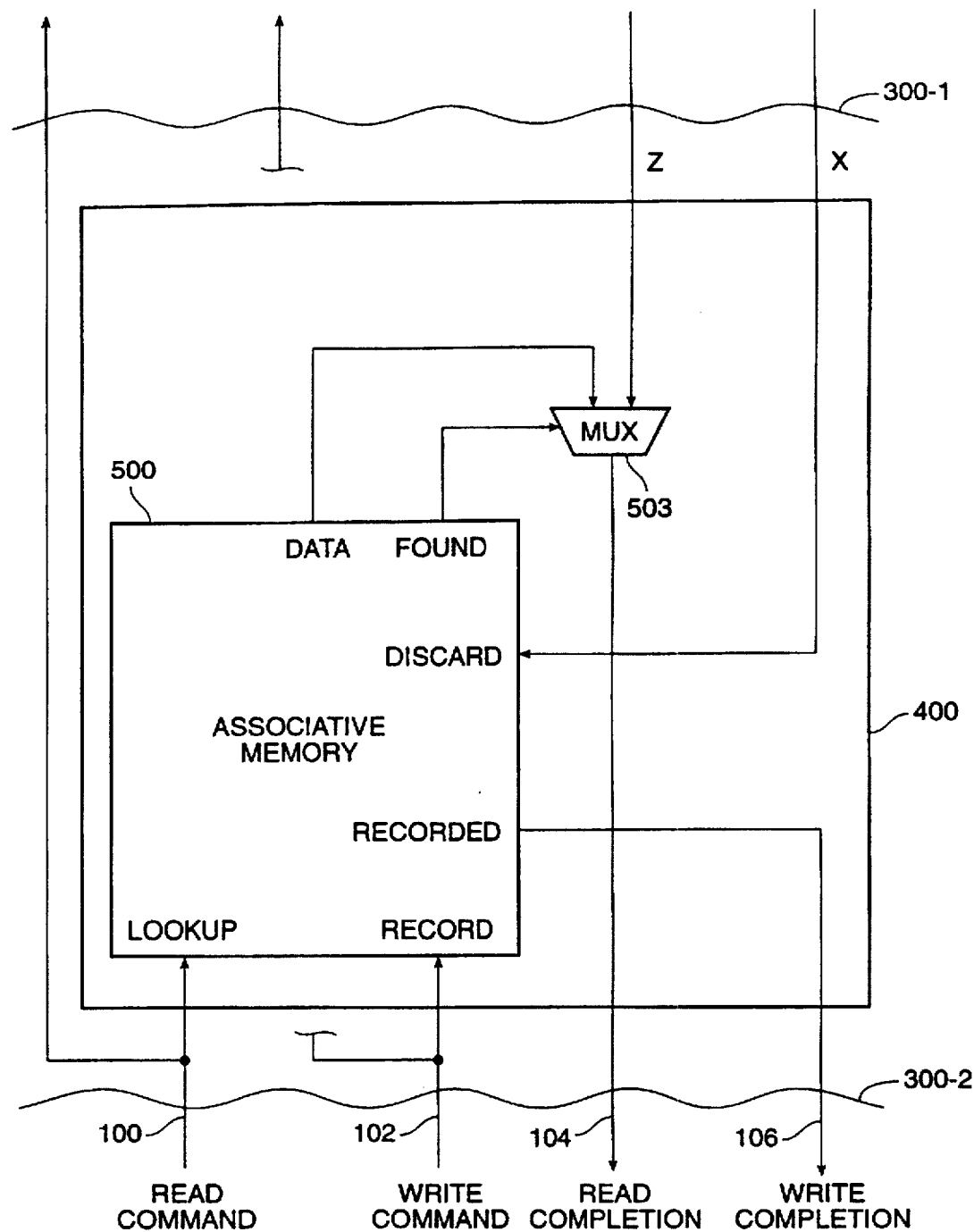
FIG. 5A shows an exemplary implementation of the write buffer of FIG. 4 using associative memory.

One exemplary implementation of write buffer 400 according to the present invention is shown in FIG. 5A. Write buffer 400 as depicted in FIG. 5A uses an associative memory 500 to reduce the time that write commands are outstanding. In this embodiment, read command channel 100 and write command channel 102 respectively connect to LOOKUP and RECORD input terminals of associative memory 500. The recording of write data in associative memory 500 is indicated by the signal on the terminal RECORDED that connects to write completion channel 106. Associative memory 500 also has a DISCARD terminal that receives the signal from write completion path X. When data is written into main memory (310 in FIG. 4), a signal on DISCARD removes its corresponding entry in associative memory 500. A multiplexer 503 receives read completion path Z and DATA output from associative memory 500 at its inputs, and selects the data on one of its two inputs to pass to its output terminal based on FOUND signal from associative memory 500. FOUND is asserted to allow DATA to be supplied to read completion channel 104 when associative memory 500 receives a read command with an address that matches that of a value most recently written in associative memory 500.

Figure 5B:
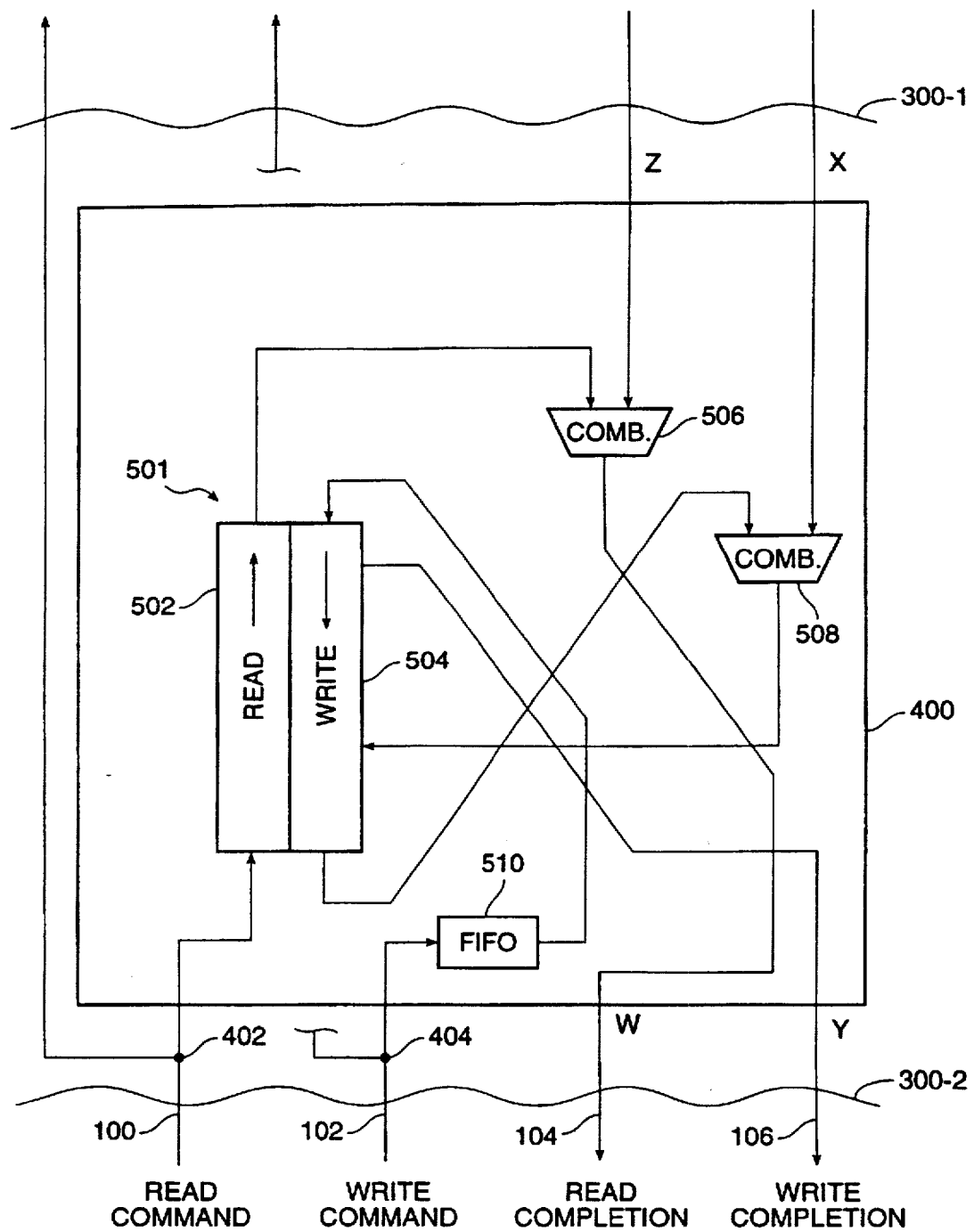
FIG. 5B shows another exemplary implementation of the write buffer of FIG. 4 using a counter-flow pipeline.

Associative memory 500 may be implemented, for example, by a counterflow pipeline. FIG. 5B illustrates how a counterflow pipeline is used to implement an associative memory according to an exemplary embodiment of the present invention. In this embodiment, counterflow pipeline (CFP) 501 acts as local memory and processing element. CFP 501 includes a read pipeline 502 and a write pipeline 504. As drawn, read commands flow upward in pipeline 502 and write commands flow downward in pipeline 504. The input of read pipeline 502 connects to read command channel 100, and the output is fed into one input of a read combiner 506. The other input of read combiner 506 receives the signal on memory read completion path Z. Write pipeline 504 receives write command 102 via a FIFO 510. The primary function of FIFO 510 is to separate write command channel 102 from the input to write pipeline 504 of CFP 501. FIFO 510 is preferably a short FIFO that decouples the activity on the connections to and from CFP 501. The output of write pipeline 504 and the signal from 35 memory completion path X feed into two inputs of a write combiner 508, respectively. Combiners 506 and 508 combine the flows from their two inputs, passing the signal on one or the other path to its output when elements are available on both. Combiner 508 accepts messages in matched pairs from write completion path X and write pipeline 504 and signals to write pipeline 504 that it no longer needs to store that particular write data. Dots 402 and 404 at branch points indicate a branch in the communication path where each data element is sent both ways in parallel (as in FIG. 4).

In operation, within CFP 501, write commands carry both an address and data. Read commands also carry an address and have a place for data, but the data value is initially undefined. When a read and write command meet, they compare addresses. Upon finding a match, the read command garners the data from the write command, replacing its data field and making it valid. Thus, if the read command emerges from the counterflow pipeline with valid data, that data reflects the value of the last write command to enter the pipeline. The read combiner 506 tests the data value from CFP 501, and if valid, forwards it to read completion channel 104. Otherwise, read data from memory data path Z is forwarded by combiner 506 to read completion channel 104.

As discussed above in connection with FIG. 4, completion paths W and Y from write buffer 400 serve the user through interface 300-2 and are quite separate from completion paths Z and X at interface 300-1 from the main memory. Completion path Z carries read data from the main memory, while completion path W carries data either from the main memory or from the write buffer. Write completion path X carries the write completion signal from the main memory, while write completion path Y is used by write buffer 400 to indicate that it has completed its faster recording process. A faster return on write completion path Y reduces the chance for concurrent read of the written location.

FIFO 510 and write pipeline 504 together are essentially a model of what takes place in the write path of the main memory. Similarly, read pipeline 502 provides a model of the read path for the main memory.

The local memory in the write buffer behaves somewhat like a cache memory. Unlike a cache, whose content might be declared obsolete, this memory is used to ensure that a read operation generates useful data. Its function is that of a write buffer rather than a cache, but may operate as an optional cache. When a write completion message comes from the memory system, the write buffer may forget the corresponding write message. It need not, however, forget it. Instead, it may choose to keep the data handy to provide more rapid response to a subsequent read command. This, of course, is a caching function. The act of saving such data when a message arrives on the write completion channel, converts the write buffer function into the cache function. While the use of the write buffer is required to avoid the ambiguity problem, the caching function is purely optional.

Figure 5C:
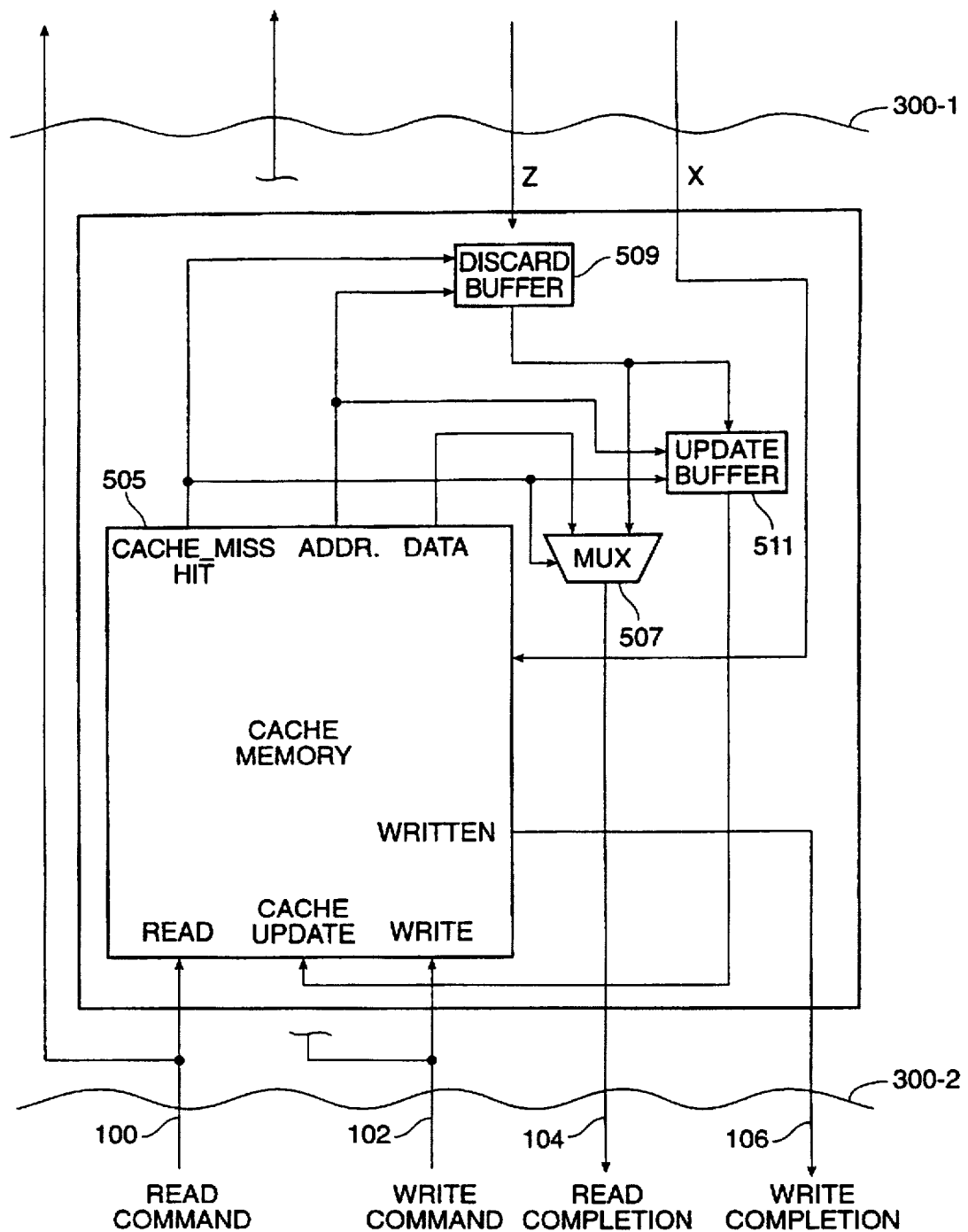
FIG. 5C shows an exemplary implementation of the write buffer of FIG. 4 for use in an embodiment of the present invention where read and write commands may be processed out of sequence.

As discussed above, one embodiment of the interface of the present invention uses sequence identifying tag bits in the read and/or write commands, which enables it to process out-of-sequence read or write operations. In this embodiment, a cache memory can be used as the write buffer. FIG. 5C shows an embodiment for a write buffer that is implemented using a cache memory. Referring to FIG. 5C, there is shown a cache memory 505 that receives read command channel 100 and write command channel 102 at its READ and WRITE inputs respectively. A WRITTEN output of cache memory 505 connects to write completion channel 106. A read command is concurrently applied to the main memory (not shown) and cache memory 505. If a hit is found in cache memory 505, DATA from cache memory 505 is supplied to read completion channel 104 via multiplexer 507. When read data finally arrives from the main memory on read path Z, the data is discarded in discard buffer 509. In case of a cache miss, however, no data from cache memory 505 is supplied on DATA line, and instead, a CACHE_MISS signal allows read data from read path Z to pass to read completion channel 104 via multiplexer 507. In this case, read data is also supplied to an update buffer 511 which then writes the read data value into cache 505 to update its content.

Figure 6:
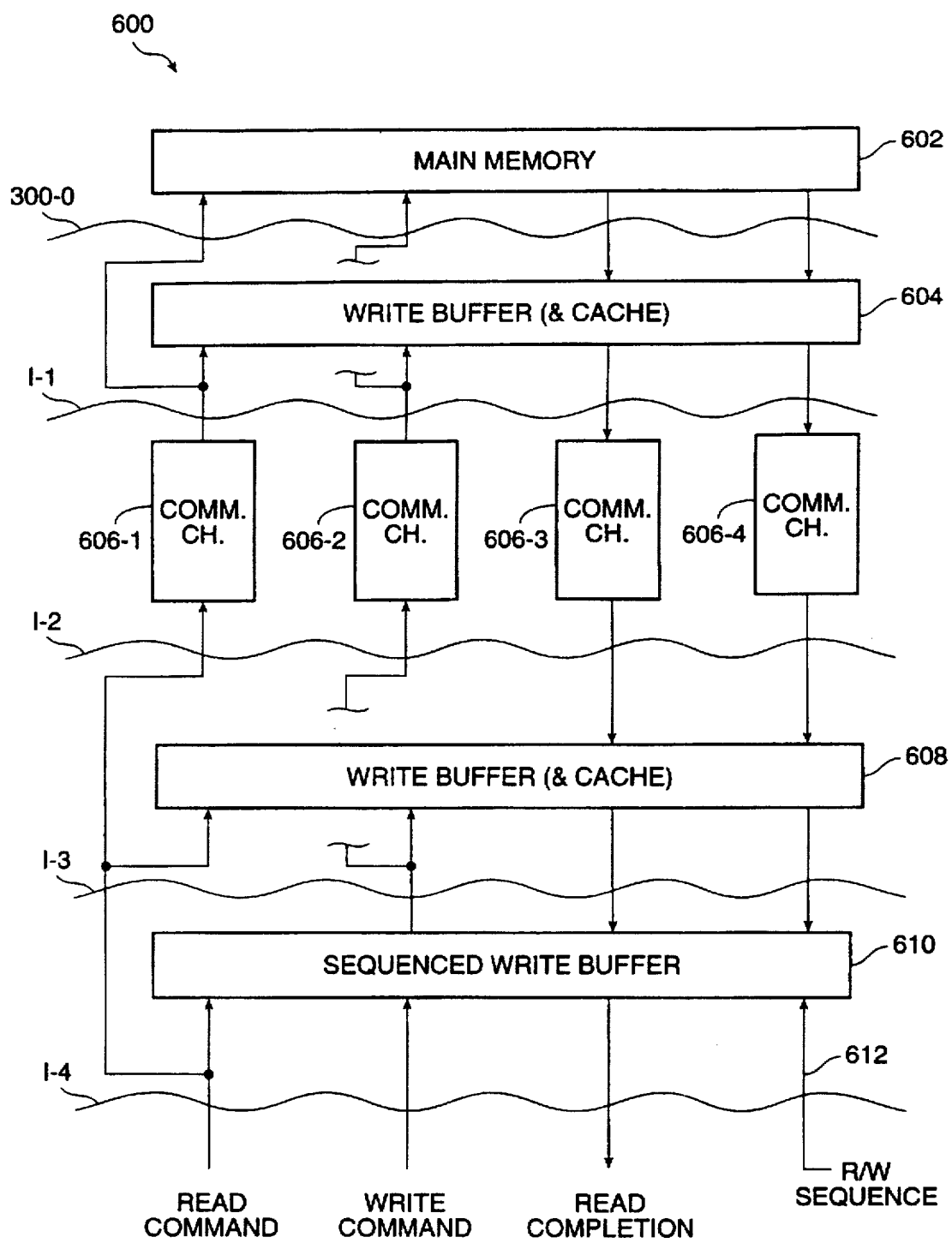
FIG. 6 shows a multi-level memory system using the recursive interface according to the present invention as well as the use of a sequenced write buffer.

The recursive interface of the present invention facilitates multi-level memory systems. FIG. 6 illustrates an exemplary multi-level memory system 600 wherein multiple write buffers are used to further enhance the speed of operation and the reliability of read data. In the example shown in FIG. 6, system 600 includes four levels of memory. At the top is a main memory 602 that uses interface 300-0, the four-channel recursive asynchronous interface of the present invention. Below it is a write buffer 604 that communicates with the rest of the system via a second identical four-channel interface I-1. In this example, main memory 602 and write buffer 604 are physically separate from the rest of the system, and accordingly interface I-1 connects to the rest of the system via four communication channels 606-1, 606-2, 606-3, and 606-4. The communication channels connect to a second write buffer 608 via interface I-2 that is identical to 300-0 and I-1. Write buffer 608 takes care of writes in flight through the communication channels 606, whereas write buffer 604 at the other end of the communication channels accounts for writes in flight through main memory 602.

Finally, at the bottom of FIG. 6 appears a sequenced write buffer 610 communicating to write buffer 608 via interface I-3 that is identical to interfaces 300-0, I-1, and I-2. Any one or all of the write buffers may be equipped to perform an optional caching function. The lower interface I-4 to sequenced write buffer 610 differs from the other interfaces because it is used directly by a processor and defines the sequence of reads and writes. Sequenced write buffer 610 accepts read and write commands sequentially, forbidding concurrent read and write operations. Interface I-4 is shown with a R/W sequence channel 612, an asynchronous input channel that indicates the sequence in which the memory is to treat reads and writes. Channel 612 is, for example, an asynchronous bundled data interface with a single bit to indicate the sequence of reads and writes. If R/W sequence channel 612 indicates that a read is next, buffer 610 waits for read data and a request on the read command channel. If R/W sequence channel 612 indicates a write is next, buffer 610 waits for write data and a request on the write command channel. If the read and write data are available before the sequence channel bit, buffer 610 may accept the data in FIFOs of any length (not shown in FIG. 6), but wait for the sequence information so as to treat the reads and writes in the proper order. Because interface I-4 processes read and write commands sequentially, it can omit the write completion channel since write completion always precedes the start of the next read. It is to be understood that other forms of sequential interface are possible.

The multiple write buffers remove any residual read output ambiguity that exists in a single buffer system. In the exemplary multi-level memory system of FIG. 6, the responsibility for correct read output value rests with different buffers at different times. First, buffer 610 removes some of the ambiguity until released by a write completion signal from buffer 608. Next, buffer 608 takes the responsibility until released by buffer 604 via FIFO 606-4. Finally, buffer 604 takes the responsibility until released by main memory 602 when it indicates that it has completed the write operation. Each buffer contributes to the elimination of the read-after-write type of ambiguity at the different stage in the system.

Figure 7:
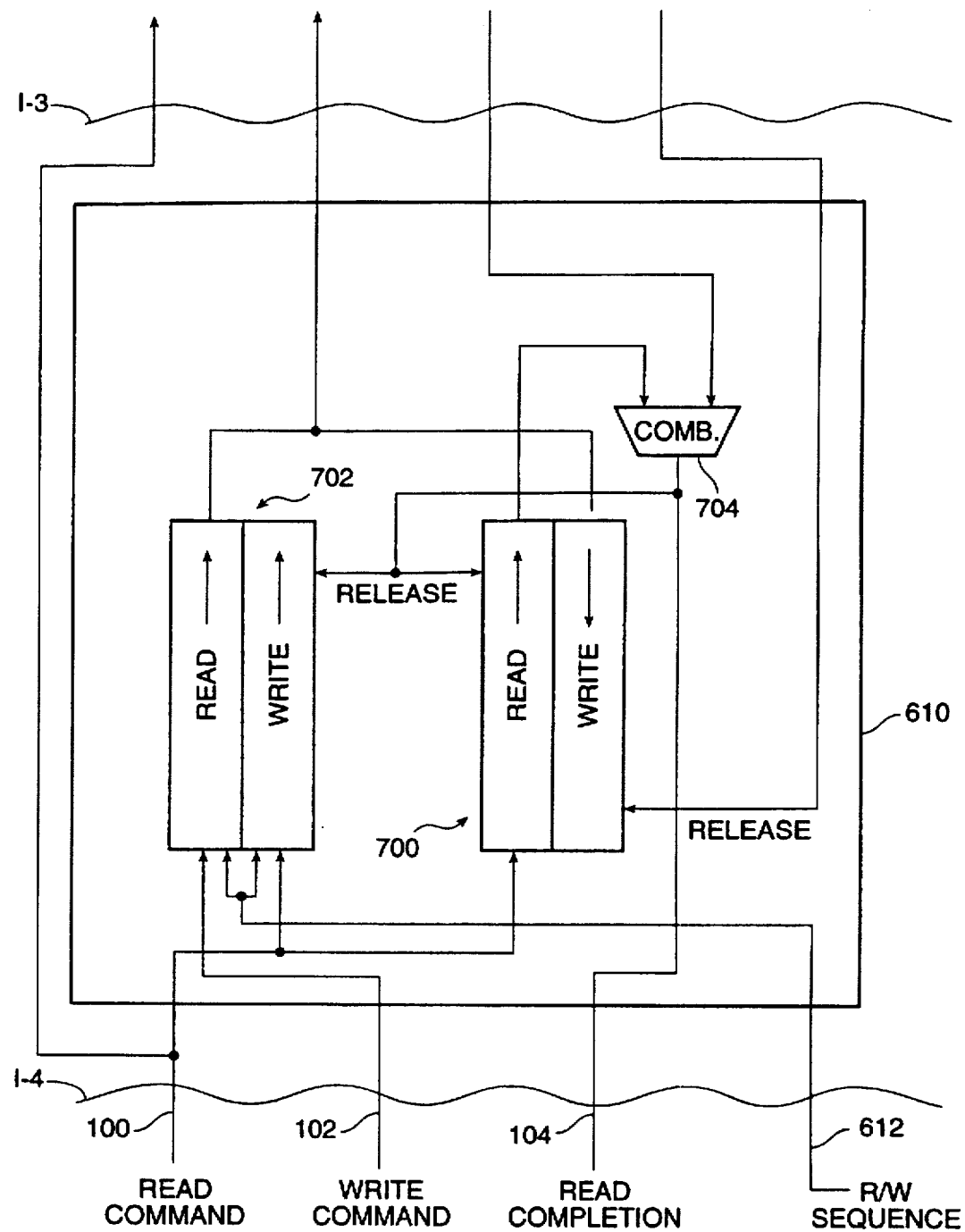
FIG. 7 shows an exemplary implementation of the sequenced write buffer for use in the memory system of FIG. 6.

Sequenced write buffer 610 enables the system to effectively remove the second type of read value ambiguity caused by the nearly concurrent matching address write-after-read condition. Under this condition, a read operation is already in progress when a write command is issued to the same memory location. With the knowledge of the sequence of the read and write commands, when a matching write is encountered, buffer 610 delays the matching write until the read operation is complete. According to an embodiment of the present invention, associative memory is preferably used to implement the sequenced write buffer. Using the counterflow pipeline example, a second read/write pipeline can be included that does not allow a write to pass a matching read within the pipeline. FIG. 7 shows such an exemplary implementation of sequenced write buffer 610. Write buffer 610 includes a read/write counter flow pipeline (CFP) 700 that is similar to and performs the same function as pipeline 501 in write buffer of FIG. 5B. Similar to read combiner 506 in write buffer of FIG. 5, a combiner 704 tests the data value from the read pipeline in CFP 700, and if valid, forwards it to read completion channel 104. Otherwise, read data from the memory data path is forwarded to read completion channel 104.

Buffer 610 further includes a second read/write pipeline 702 with the read pipeline receiving read command channel 100 and the write pipeline receiving write command channel 102. Both the read and the write pipelines also receive R/W sequence channel 612 that supplies the sequence information to the pipeline. In contrast to CFP 700, the read and the write pipelines in pipeline 702 flow in the same direction. The signal on R/W sequence channel 612 controls the sequence of read and write commands in pipeline 702. Thus, when pipeline 702 detects a write with an address that matches the address of a read moving through the pipeline, the write pipeline is stalled and the matching write is not allowed to pass the read command. In this way, the matching write operation is processed after the read cycle is completed.

Figure 8:
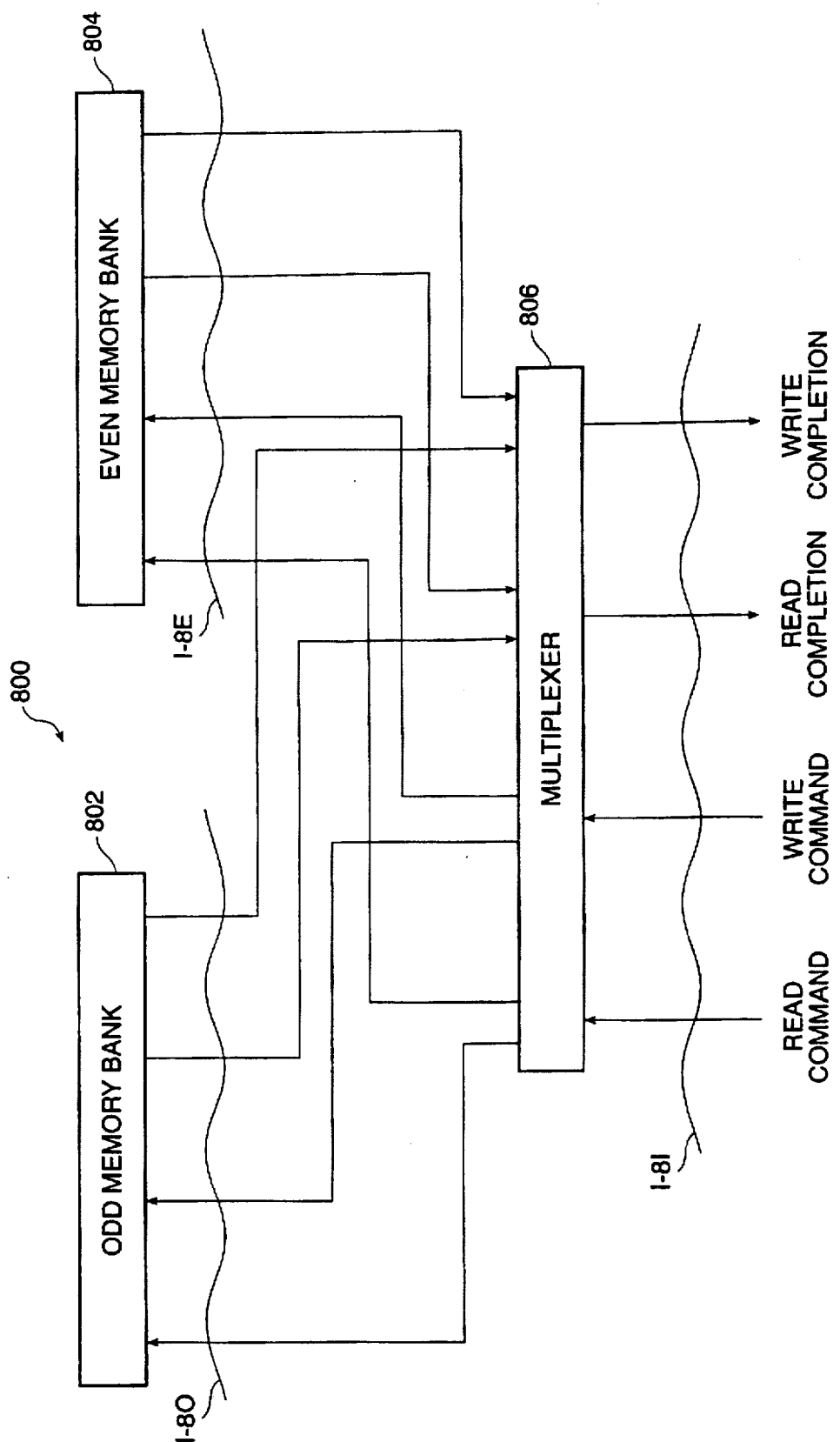
FIG. 8 shows yet another embodiment of a memory system with multiple banks of memory using the interface of the present invention.

The interface of the present invention permits construction of higher performance memory systems using address interleaving. Referring to FIG. 8, there is shown a memory system 800 with two banks of memory 802 and 804. This exemplary embodiment of a multi-bank memory system uses the version of the interface that does not include sequence identifying tag bits, and thus preserves the order in which read and write commands arrive. Two identical four-channel interfaces I-8E and I-8O appear below memory banks 802 and 804, respectively. The total of eight channels from interfaces I-8E and I-8O are connected to one side of a multiplexer 806. A third four-channel interface I-81 identical to I-8E and I-8O appears on the other side of multiplexer 806. Multiplexer 806 steers read and write commands to the appropriate bank of memory. It also combines the returning read and write completion signals to keep its responses on interface I-81 in the proper sequence. A write buffer for both memory banks 802 and 804 can attach to interface I-81. Note that the recursive nature of the interface of the present invention allows the entire memory system 800 as a unit to behave as memory system 101 of FIG. 1.

Multiplexer 806 steers read and write commands to their appropriate banks according to their addresses. It also merges the streams of completion signals from the two banks in such a way as to preserve the order of completion signals at its outputs to interface I-81. One implementation of the multiplexer preserves the order of its outputs by passing all read commands through one internal FIFO (not shown) and all write commands through another. The outputs of these FIFOs indicate the bank to which the command was sent, and thus indicate which bank's completion signal to honor next. Since the write buffer according to the present invention, an exemplary embodiment of which is shown in FIG. 5, includes such internal FIFOs for read and write commands (albeit in the form of a counterflow pipeline), it is possible to incorporate the multiplexing function into the write buffer. In that case, the outputs of the counterflow pipeline would indicate which bank's completion signal to honor next.

In conclusion, the present invention offers a recursive interface that can be used in for example multi-level memory systems. The recursive interface permits concurrent read and write operations. Separate read and write command channels and read and write completion channels provide for a highly flexible interface that retains its properties even if separated from the system it interfaces with by communication channels having arbitrary delays. A write buffer that includes a small local memory corrects ambiguities arising out of concurrent read and write operations at the same memory location. While the above describes exemplary embodiments of the present invention, it is possible to use various alternatives, modifications and equivalents. For example, the exemplary embodiments shown in the figures depict a system with multiple levels of memory, FIFOs and write buffers. The recursive nature of the interface of the present invention allows any type of circuit element to be inserted in the communication channels in any order (i.e., at any level) without impacting the interface properties. Thus, the order in which FIFOs and write buffers appear in the figures are only illustrative and other combinations are possible. Therefore, the scope of the present invention should be determined not with reference to the above description but should, instead, be determined with reference to the appended claims, along with their full scope of equivalents.

What is claimed is:

1. An interface for a memory system comprising:
   a read command channel carrying read address;
   a write command channel carrying write address and write data;
   a read completion channel carrying data read from memory; and
   a write completion channel carrying a write completion signal, wherein, the read command, write command, read completion, and write completion channels are independent channels permitting concurrent read and write operations.

2. The interface for a memory system as in claim 1 wherein the interface guarantees completion of concurrent read and write operations to the same memory location.

3. The interface for a memory system as in claim 2 wherein the concurrent read and write operations to the same memory location guarantee data written to be correct but do not guarantee the integrity of data read.

4. The interface for a memory system as in claim 1 wherein a sequence of the data read from memory in the read completion channel is the same as a sequence of read addresses in the read command channel.

5. The interface for a memory system as in claim 1 wherein a sequence of write completion signals in the write completion channel is the same as a sequence of write addresses in the write command channel.

6. The interface for a memory system as in claim 1 wherein a sequence of the data read from memory in the read completion channel is the same as a sequence of read addresses in the read command channel, and a sequence of write completion signals in the write completion channel is the same as a sequence of write addresses in the write command channel.

7. The interface for a memory system as in claim 1 wherein the read command channel further carries read command sequence identifying information to permit out of sequence processing of read commands.

8. The interface for a memory system as in claim 1 wherein the write command channel further carries write command sequence identifying information to permit out of sequence processing of write commands.

9. The interface for a memory system as in claim 1 wherein the read command channel further carries read command sequence identifying information and the write command channel further carries write command sequence identifying information to permit out of sequence processing of read and write commands.

10. The interface for a memory system as in claim 1 wherein the read completion channel carries the read address in addition to the data read from memory.

11. The interface for a memory system as in claim 1 wherein the write completion channel carries the write address in addition to the write completion signal.

12. The interface for a memory system as in claim 1 further comprising a read/write sequence channel, wherein the read/write sequence channel is an asynchronous interface with at least one bit indicating a sequence of read and write operations.

13. The interface for a memory system as in claim 1 wherein instead of the write completion channel the interface includes a read/write sequence channel, the read/write sequence channel being an asynchronous interface with at least one bit indicating a sequence of read and write operations.

14. A memory system comprising:
    a memory array;
    a read path coupled between a read command channel and a read completion channel, the read path communicating with the memory array via a read address bus and a read data bus;
    a write path coupled between a write command channel and a write completion channel, the write path communicating with the memory array via a write address bus and a write data bus,
    wherein, the write path and the read path are independent, permitting concurrent read and write operations.

15. The memory system of claim 14 wherein the read path and the write path each comprise communication means having arbitrary delay.

16. The memory system of claim 14 wherein the read path comprises a set of registers of the first in first out (FIFO) type.

17. The memory system of claim 14 wherein the write path comprises a set of registers of the first in first out (FIFO) type.

18. The memory system of claim 14 wherein the read and the write paths each comprise a set of registers of the first in first out (FIFO) type.

19. The memory system of claim 15 wherein the read and the write paths are asynchronous.

20. A multi-channel interface comprising:
    a primary interface for communicating with an information-handling system, the primary interface comprises:
      a first channel carrying information to the information-handling system,
      a second channel carrying information from the information-handling system and in response to the information carried in the first channel,
      a third channel carrying information to the information-handling system, and
      a fourth channel carrying information from the information-handling system and in response to the information carried in the third channel; and
    four communication channels with arbitrary delays each having a first and a second terminal, the first terminals of the four communication channels being respectively coupled to the first, second, third, and fourth channels, wherein, the second terminals of the four communication channels form a secondary interface with four channels that retain all properties of the four channels of the primary interface.

21. The multi-channel interface of claim 20 wherein the information-handling system is a memory array.

22. The multi-channel interface of claim 21 wherein the first channel is a read command channel carrying read address, the second channel is a read completion channel carrying data read from the memory array, the third channel is a write command channel carrying write address and write data, and the fourth channel is a write completion channel carrying a write completion signal.

23. The multi-channel interface of claim 20 wherein the communication channel is any one of a transmission line, buffer, first in first out set of registers, transition queues, or the like.

24. A memory system comprising:

a memory array; and a first interface coupled to the memory array, the first interface comprising:
- a read command channel carrying read address, and coupled to the memory array,
- a write command channel carrying write address and write data, and coupled to the memory array,
- a read completion channel coupled to the memory array and carrying data read from the memory array, and
- a write completion channel coupled to the memory array and carrying a write completion signal, wherein, the read command, write command, read completion, and write completion channels are independent channels permitting concurrent read and write operations.

25. The memory system of claim 24 further comprising:
- a write buffer coupled to the first interface and receiving the read command, write command, read completion and write completion channels of the first interface; and
- a second interface identical to the first interface, the second interface having read and write command channels respectively coupled to the read and write command channels of the first interface, and a read and write completion channels coupled to the write buffer.

26. The memory system of claim 25 wherein the write buffer comprises:

an associative memory having a read input coupled to said read command channel, a write input coupled to said write command channel, and a write output coupled to said write completion channel of said second interface; and a select circuit having a first input coupled to a read output of said associative memory, a second input coupled to said read completion channel of said first interface, and an output coupled to said read completion channel of said second interface.

27. The memory system of claim 26 wherein said associative memory further includes a FOUND output coupled to a control input of said select circuit, and a DISCARD input coupled to said write completion channel of said first interface.

28. The memory system of claim 25 wherein the write buffer comprises:
- a read pipeline having an input coupled to the read command channel;
- a write pipeline having an input coupled to the write command channel; and
- a first combine circuit having a first input coupled to the read completion channel of the first interface, a second input coupled to an output of the read pipeline, and an output coupled to the read completion channel of the second interface, wherein, the read and write pipelines couple together and form a counterflow pipeline, such that upon detection of a matching read address in the read pipeline and a write address in the write pipeline, write data from the write pipeline is transferred to the read pipeline and supplied to the read completion channel of the second interface through the first combine circuit.

29. The memory system of claim 28 wherein the write buffer further comprises a second combine circuit having a first input coupled to the write completion channel of the first interface, a second input coupled to an output of the write pipeline, and an output.

30. The memory system of claim 29 wherein the write buffer further comprises a first-in first-out (FIFO) register coupled between the write command channel and the input of the write pipeline.

31. The memory system of claim 28 wherein the counterflow pipeline includes a plurality of storage elements that provide an optional caching function.

32. The memory system of claim 24 further comprising:
- a sequenced write buffer coupled to the primary interface and receiving the read command, write command, read completion and write completion channels of the first interface; and
- a second interface having read and write command channels respectively coupled to the read and write command channels of the first interface, a read completion channel and a read/write sequence channel coupled to the write buffer, wherein, the read/write sequence channel carries a signal identifying a sequence of read and write operations.

33. The memory system of claim 32 wherein the sequenced write buffer comprises:
- a read pipeline having an input coupled to the read command channel;
- a write pipeline having an input coupled to the write command channel; and
- a first combine circuit having a first input coupled to the read completion channel of the first interface, a second input coupled to an output of the read pipeline, and an output coupled to the read completion channel of the second interface, wherein, the read and write pipelines couple together and form a counterflow pipeline.

34. The memory system of claim 24 further comprising:
- a first communication channel element having a first terminal coupled to the read command channel of the first interface, and a second terminal coupled to a read command channel of a second interface;
- a second communication having a first terminal coupled to the read completion channel of the first interface, and a second terminal coupled to the read completion channel of the second interface;
- a third communication channel having a first terminal coupled to the write command channel of the first interface, and a second terminal coupled to the write command channel of the second interface;
- a fourth communication channel having a first terminal coupled to the write completion channel of the first interface, and a second terminal coupled to a write completion channel of the second interface, wherein, the read command, read completion, write command and write completion channels of the second interface are identical to and retain the same properties as the read command, read completion, write command and write completion channels of the first interface regardless of the amount of delay introduced by each communication channel.

35. The memory system of claim 34 further comprising:
- a write buffer coupled between the second interface and a third interface that is identical to the first and the second interface, wherein, a read command channel and a write command channel of the third interface couple to the read and write command channels of the second interface, respectively, and couple to the write buffer, and wherein, the read and write completion channels of the second interface respectively couple to read and write completion input channels of the write buffer, and a read completion channel and a write completion channel of the third interface respectively couple to read and write completion output channels of the write buffer.

36. The memory system of claim 35 further comprising a second write buffer coupled between the third interface and a fourth interface, wherein, the fourth interface includes a read command channel and a write command channel respectively coupled to the read and write command channels of the third interface, and coupled to the second write buffer, and wherein the read and write completion channels of the third interface couple to a read completion input channel and a write completion input channel of the second write buffer, respectively, and wherein, a read completion channel of the fourth interface couples to a read completion channel of the write buffer, and wherein, the fourth interface includes a read/write sequence channel coupled to the second write buffer, the read/write sequence channel defines a sequence of read and write operations.

37. The memory system of claim 24 further comprising one or more write buffers coupled to the memory array and each other via the first interface and a respective number of additional interfaces that are identical to the first interface, wherein, each write buffer includes a read command channel and a write command channel, a read completion input channel and a write completion input channel, a read completion output channel and a write completion output channel, and wherein, the read command and write command channels of the one or more write buffers respectively couple in parallel to read and write command channels of the first interface and the additional interfaces, and wherein, the read and write completion input and output channels of the one or more write buffers respectively couple in series to read and write completion channels of the first and the additional interfaces.

38. The memory system of claim 37 further comprising a group of four communication channels in the read and write command channels, and read and write completion channels, respectively, and at any one of the interfaces.

39. A memory system comprising:

a first memory bank coupled to a multiplexer via a first interface;

a second memory bank coupled to the multiplexer via a second interface; and a third interface coupled to the multiplexer, wherein the first, second and third interface are identical, each comprising:

a read command channel carrying read address;

a write command channel carrying write address and write data;

a read completion channel carrying data read from an associated memory bank; and a write completion channel carrying a write completion signal, wherein, the read command, write command, read completion, and write completion channels are independent asynchronous channels permitting concurrent read and write operation, and wherein, the multiplexer selectively routes the read and write command channels from the third interface respectively to the read and write command channels of one of the first or second interface in response to read and write address information, and wherein, the multiplexer selectively routes the read and write completions channels from one of the first or the second interface to the read and write completion channels of the third interface.

40. The interface of claim 1 wherein the read command, write command, read completion and write completion channels are combined into less than four physical channels of communication.

* * * * *